US012800897B2

(12) United States Patent
Morita et al.

(10) Patent No.: US 12,800,897 B2
(45) Date of Patent: Nov. 17, 2026

(54) LIGHT MEASUREMENT DEVICE AND SCANNING MICROSCOPE

(71) Applicant: Evident Corporation, Tatsuno-machi (JP)

(72) Inventors: Kohei Morita, Kamiina-gun (JP); Ryusuke Tanaka, Kamiina-gun (JP)

(73) Assignee: Evident Corporation, Kamina-Gun (JP)

( * ) Notice: Subject to any disclaimer, the term of this patent is extended or adjusted under 35 U.S.C. 154(b) by 217 days.

(21) Appl. No.: 18/763,460

(22) Filed: Jul. 3, 2024

(65) Prior Publication Data

US 2025/0020900 A1 Jan. 16, 2025

(30) Foreign Application Priority Data

Jul. 12, 2023 (JP) ................................ 2023-114575

(51) Int. Cl.
*G02B 21/00* (2006.01)
*G02B 21/36* (2006.01)

(52) U.S. Cl.
CPC ..... *G02B 21/0084* (2013.01); *G02B 21/0016* (2013.01); *G02B 21/365* (2013.01)

(58) Field of Classification Search
CPC ............ G02B 21/0084; G02B 21/0016; G02B 21/365; G02B 21/008; G01J 1/44; G01J 2001/4238; G01J 2001/442; G01J 2001/444; G01J 2001/4466
See application file for complete search history.

(56) References Cited

U.S. PATENT DOCUMENTS

| | | | | |
|---|---|---|---|---|
| 5,446,287 | A | 8/1995 | Schreck | |
| 11,237,047 | B2 | 2/2022 | Imoto et al. | |
| 2002/0142496 | A1* | 10/2002 | Nakasuji | G01N 23/2251 250/492.3 |
| 2009/0173898 | A1 | 7/2009 | Kitahara et al. | |
| 2020/0217716 | A1* | 7/2020 | Imoto | G01J 1/04 |
| 2022/0351935 | A1* | 11/2022 | Kobayashi | H01J 37/222 |

FOREIGN PATENT DOCUMENTS

| | | | |
|---|---|---|---|
| JP | 2004144734 | A | 5/2004 |
| JP | 2023008411 | A | 1/2023 |
| WO | 2019058438 | A1 | 3/2019 |
| WO | 2019058619 | A1 | 3/2019 |

OTHER PUBLICATIONS

Extended European Search Report (EESR) dated Nov. 11, 2024, issued in counterpart European Application No. 24187986.5.

* cited by examiner

*Primary Examiner* — Mariam Qureshi
(74) *Attorney, Agent, or Firm* — Holtz, Holtz & Volek PC

(57) ABSTRACT

The light measurement device includes: a photodetector that detects pulsed signal light and outputs a detection signal including an exponential response; an A/D conversion circuit that converts the detection signal into a digital signal; and a processor that performs setting of a transformation matrix for inversely converting the digital signal, and inverse conversion of the digital signal by the set transformation matrix to calculate an estimated pulse of the signal light.

11 Claims, 12 Drawing Sheets

LIGHT MEASUREMENT DEVICE AND SCANNING MICROSCOPE

CROSS REFERENCE TO RELATED APPLICATIONS

This application is based upon and claims the benefit of priority of the prior Japanese Patent Application No. 2023-114575, filed Jul. 12, 2023, the entire contents of which are incorporated herein by reference.

BACKGROUND OF THE INVENTION

Technical Field

The disclosure of the present specification relates to a light measurement device and a scanning microscope.

Description of the Related Art

In a laser scanning microscope, a sample has been two-dimensionally scanned with a laser beam, fluorescence generated in the sample has been detected by a photodetector, and an image has been reconstructed and displayed based on a detection signal.

However, depending on the type of the photodetector to be used, crosstalk may occur in the detection signal, and light incident on the photodetector may not be correctly detected. For example, semiconductor optical sensors are inexpensive and highly sensitive, but as semiconductor optical sensors have a characteristic that a sensor reaction time is long, when the semiconductor optical sensor has been used as a photodetector, crosstalk may occur in the detection signal.

To solve such a problem, in the scanning microscope described in WO 2019/058619 A, a detection signal of a photodetector (optical sensor unit) has been inversely converted by a transformation matrix (by performing convolution by an inverse matrix that cancels a sensor response) to estimate light incident on the photodetector.

SUMMARY OF THE INVENTION

A light measurement device according to an aspect of the present invention includes: a photodetector that detects pulsed signal light and outputs a detection signal including an exponential response; an A/D conversion circuit that converts the detection signal into a digital signal; and a processor that performs setting of a transformation matrix for inversely converting the digital signal and inverse conversion of the digital signal by the set transformation matrix to calculate an estimated pulse of the signal light.

A scanning microscope according to an aspect of the present invention includes: a scanner that scans a sample with illumination light emitted from a light source; an optical system that condenses the illumination light scanned by the scanner on the sample and condenses signal light generated at each scanning position of the illumination light in the sample; the light measurement device according to the above-described aspect that calculates an estimated pulse of the signal light condensed by the optical system; and a processor that reconstructs an image of the sample based on the estimated pulse calculated by the light measurement device.

DETAILED DESCRIPTION

WO 2019/058619 A does not particularly mention an aspect of a practical scanning microscope.

For example, in a practical scanning microscope, a photodetector may be replaced, a plurality of photodetectors of different types (different characteristics) may be provided, and a post-stage circuit configuration of the photodetector (circuit configuration between the photodetector and an arithmetic unit that performs inverse conversion) may be different. When the photodetector is replaced, an impulse response of the photodetector is different before and after replacement. The difference can occur due to individual differences not only in the case of replacement with different types of photodetectors but also in the case of replacement with the same type of photodetectors. Further, when a plurality of photodetectors of different types is provided, the impulse response differs for each photodetector. Further, even when the post-stage circuit configuration of the photodetector is different, the impulse response (a digital signal input to the arithmetic unit as the impulse response) is different. Note that the post-stage circuit configuration of the photodetector may further include, for example, an analog front end (AFE) circuit including an analog filter circuit and an amplifier circuit and/or a digital filter circuit, in addition to an A/D conversion circuit (A/D converter).

Therefore, in a practical scanning microscope, a transformation matrix used for inverse conversion needs to be an optimum transformation matrix according to a photodetector to be used and a post-stage circuit configuration thereof. Otherwise, the light incident on the photodetector cannot be correctly estimated.

An embodiment of the present invention will be described below with reference to the drawings.

Figure 1:
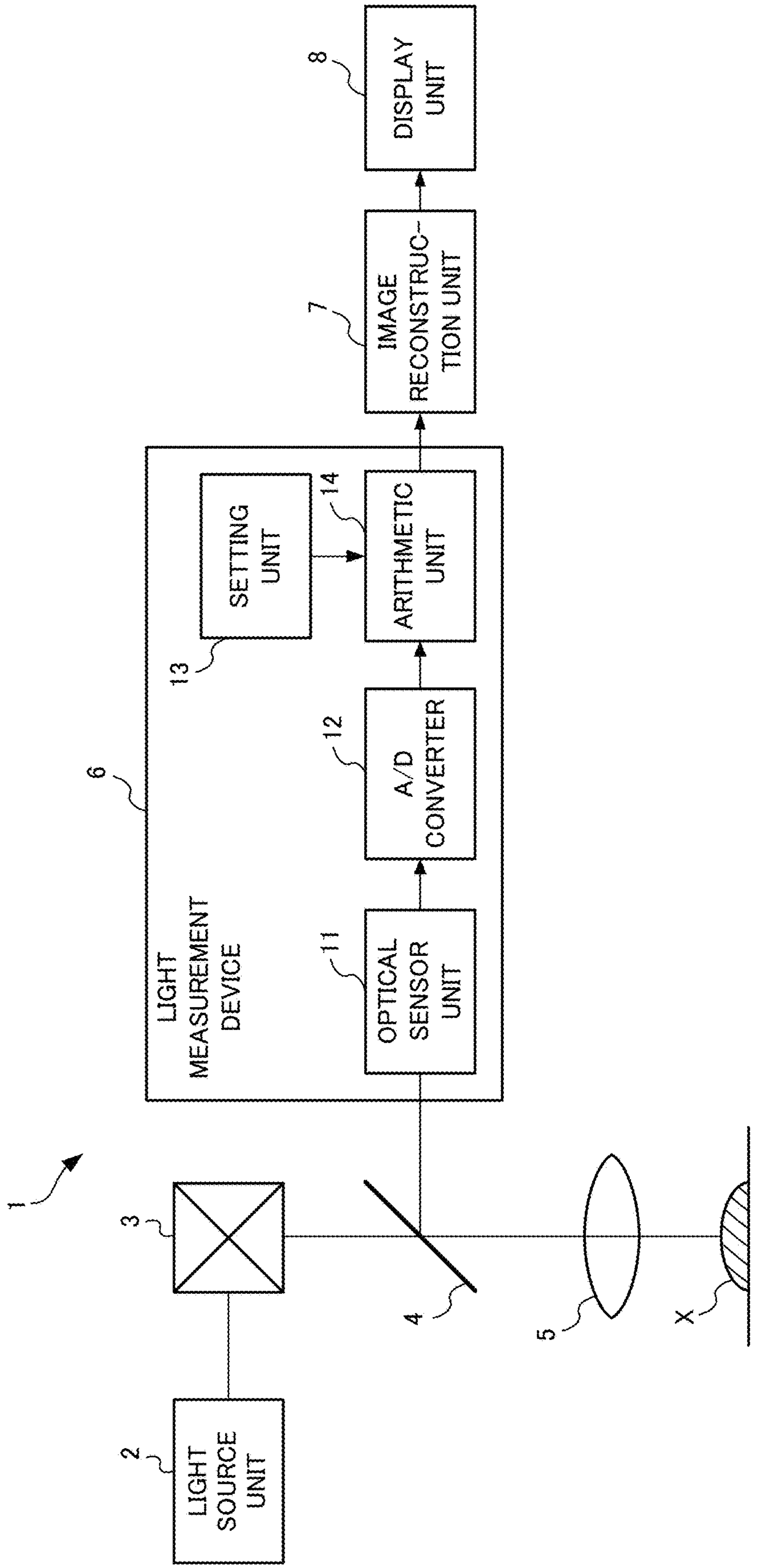
FIG. 1 is a diagram illustrating a configuration of a scanning microscope according to an embodiment.

FIG. 1 is a diagram illustrating a configuration of a scanning microscope 1 according to an embodiment.

A scanning microscope 1 illustrated in FIG. 1 includes a light source unit 2, a scanner 3, a dichroic mirror 4, an optical system 5, a light measurement device 6, an image reconstruction unit 7, and a display unit 8.

The light source unit 2 is an example of a light source, and generates an ultrashort pulsed laser beam (illumination light). The scanner 3 is an example of a scanning unit, and two-dimensionally scans laser beam emitted from the light source unit 2. The scanner 3 is, for example, a proximity galvano mirror in which two galvano mirrors are disposed close to each other. The dichroic mirror 4 transmits laser beam from the light source unit 2 and reflects fluorescence from a sample X. The optical system 5 condenses the laser beam scanned by the scanner 3 on the sample X and condenses the fluorescence generated in the sample X.

The light measurement device 6 detects fluorescence (signal light) condensed by the optical system 5 and calculates an estimated pulse. The image reconstruction unit 7 generates an image of the sample X based on the estimated pulse calculated by the light measurement device 6. More specifically, the image reconstruction unit 7 generates an image indicating the amount of detected fluorescence by arranging estimated pulses of fluorescence detected and calculated for each scanning position of the laser light by the scanner 3 at the coordinates of each scanning position. The display unit 8 displays the image generated by the image reconstruction unit 7.

The light measurement device 6 includes an optical sensor unit 11, an A/D converter 12, a setting unit 13, and an arithmetic unit 14.

The optical sensor unit 11 is a photodetector, detects pulsed fluorescence generated by irradiating a fluorescent substance in the sample X with an ultrashort pulsed laser beam, and outputs a detection signal including an exponential response of a constant time constant. The optical sensor unit 11 is, for example, a semiconductor optical sensor in which a plurality of avalanche photodiodes operating in Geiger mode are arranged.

The A/D converter 12 converts the detection signal output from the optical sensor unit 11 into a digital signal and outputs the digital signal. Note that the A/D converter 12 performs sampling with a sampling period smaller than the longest time constant of the exponential function response of the optical sensor unit 11. The A/D converter 12 is, for example, an A/D conversion circuit.

The setting unit 13 sets a transformation matrix for inversely converting the digital signal output from the A/D converter 12 in the arithmetic unit 14.

The arithmetic unit 14 inversely converts the digital signal output from the A/D converter 12 by the transformation matrix set by the setting unit 13 to calculate an estimated pulse of the signal light. More specifically, the arithmetic unit 14 calculates the estimated pulse of the signal light by performing convolution, that is, inverse conversion by an inverse matrix that cancels sensor response of the optical sensor unit 11 on the detection signal output from the optical sensor unit 11. Note that the transformation matrix set by the setting unit 13 is a transformation matrix for inverse conversion (inverse matrix). The transformation matrix for inverse conversion is created based on data obtained by A/D converting the impulse response of the optical sensor unit 11. Since the impulse response of the optical sensor unit 11 is known, the transformation matrix for inverse conversion can be obtained in advance.

In the light measurement device 6, when the type (characteristic) of the optical sensor unit 11 is different, obviously, the impulse response is different. Further, even if the types of the optical sensor units 11 are the same, the impulse response varies depending on individual differences. Therefore, the transformation matrix set in the arithmetic unit 14 by the setting unit 13 is obtained in advance according to the type and individual difference of the optical sensor unit 11 included in the light measurement device 6. For example, by calculating the transformation matrix by the method described in WO 2019/058619 A based on the digital signal output from the A/D converter 12, it is possible to obtain an optimum transformation matrix according to the type and individual difference of the optical sensor unit 11 included in the light measurement device 6. The arithmetic unit 14 can correctly calculate the estimated pulse of the signal light by performing the inverse conversion using such a transformation matrix.

According to the present embodiment, since the optimum transformation matrix according to the type and individual difference of the optical sensor unit 11 included in the light measurement device 6 is set in the arithmetic unit 14 by the setting unit 13, the arithmetic unit 14 can perform inverse conversion using the optimum transformation matrix.

The present embodiment can be variously modified.

For example, as a first modification, in the scanning microscope 1 illustrated in FIG. 1, the light measurement device 6 may further include an AFE unit and/or a digital filter unit. The AFE unit is provided between the optical sensor unit 11 and the A/D converter 12, and includes, for example, an analog filter unit and an amplifier unit. The analog filter unit reduces noise of the detection signal output from the optical sensor unit 11. The amplifier unit adjusts signal level of the output signal of the analog filter unit. The AFE unit is, for example, an AFE circuit. The digital filter unit is provided between the A/D converter 12 and the arithmetic unit 14. The digital filter unit reduces noise of the digital signal output from the A/D converter 12. The digital filter unit is, for example, a digital filter circuit.

In the first modification, the impulse response (digital signal input to the arithmetic unit 14 as the impulse response) is further different depending on the type and individual difference of the AFE unit and/or the digital filter unit. Therefore, in the first modification, the transformation matrix set in the arithmetic unit 14 by the setting unit 13 is obtained according to the type and individual difference of each of the optical sensor unit 11 and the AFE unit and/or the digital filter unit included in the light measurement device 6. For example, when the light measurement device 6 further includes the AFE unit and the digital filter unit, by calculating the transformation matrix by the method described in WO 2019/058619 A based on the digital signal output from the digital filter unit, it is possible to obtain an optimum transformation matrix according to the type and individual difference of each of the optical sensor unit 11, the AFE unit, and the digital filter unit included in the light measurement device 6. The arithmetic unit 14 can correctly calculate the estimated pulse of the signal light by performing the inverse conversion using such a transformation matrix.

According to the first modification, since the optimum transformation matrix according to the type and individual difference of each of the optical sensor unit 11 and the AFE unit and/or the digital filter unit included in the light measurement device 6 is set in the arithmetic unit 14 by the setting unit 13, the arithmetic unit 14 can perform inverse conversion using the optimum transformation matrix.

Figure 2:
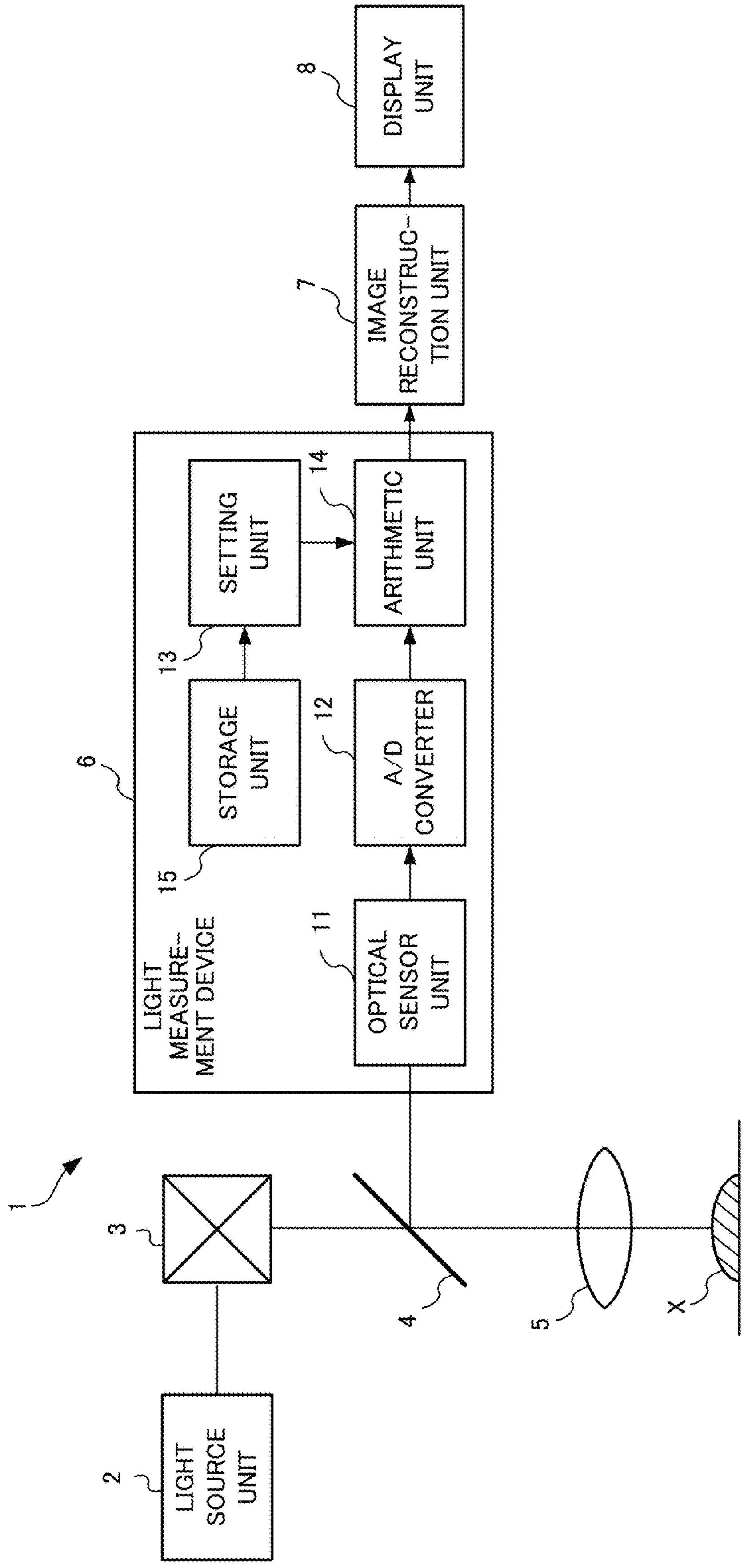
FIG. 2 is a diagram illustrating a configuration of a scanning microscope according to a second modification.
Figure 3:
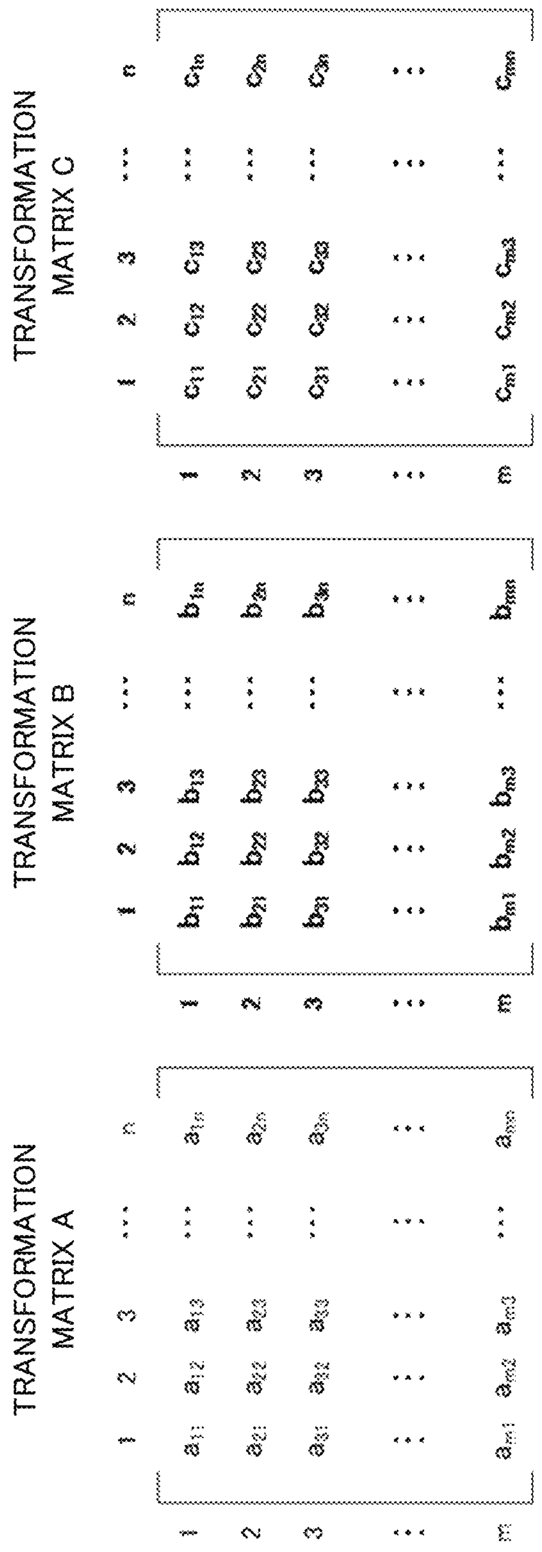
FIG. 3 is a diagram illustrating a plurality of transformation matrices.

Further, as a second modification that is another modification, the scanning microscope 1 illustrated in FIG. 1 may be configured as illustrated in FIG. 2. FIG. 2 is a diagram illustrating a configuration of the scanning microscope 1 according to the second modification; FIG. 3 is a diagram illustrating a plurality of transformation matrices.

As illustrated in FIG. 2, the light measurement device 6 may further include a storage unit 15 that stores one or more transformation matrices, and the setting unit 13 may select the transformation matrix to be set in the arithmetic unit 14 from among the one or more transformation matrices stored in the storage unit 15.

The one or more transformation matrices stored in the storage unit 15 may be, for example, a transformation matrix for each optical sensor unit 11 (optical sensor unit 11 having different type and individual difference) that can be included in the light measurement device 6. As a result, for example, assuming a case where the optical sensor unit 11 is replaced, it is possible to store a plurality of transformation matrices that consider the difference in type and individual difference in the storage unit 15.

Note that the plurality of transformation matrices stored in the storage unit 15 is, for example, a plurality of transformation matrices of m rows×n columns (transformation matrix A, transformation matrix B, and transformation matrix C) as illustrated in FIG. 3.

According to the second modification, for example, even when the optical sensor unit 11 is replaced, the setting unit 13 can select an optimum transformation matrix according to the type and individual difference of the replaced optical sensor unit 11 from among the plurality of transformation matrices stored in the storage unit 15 and set the optimum transformation matrix in the arithmetic unit 14. Therefore, the arithmetic unit 14 can perform inverse conversion using the optimum transformation matrix.

Note that, in the second modification, the setting unit 13 may select the transformation matrix to be set in the arithmetic unit 14 from among one or more transformation matrices stored in the storage unit 15 based on a user's selection input. Here, the user's selection input may be performed, for example, by the user selecting a desired transformation matrix from among one or more transformation matrices stored in the storage unit 15 via an input unit (not illustrated) included in the scanning microscope 1, or may be performed by the user selecting a desired optical sensor unit 11. In the latter case, the setting unit 13 may select the transformation matrix corresponding to the optical sensor unit 11 selected by the user from among one or more transformation matrices stored in the storage unit 15. As a result, the transformation matrix according to the user's selection input can be set in the arithmetic unit 14.

Further, as a third modification that is another modification, in the scanning microscope 1 illustrated in FIG. 2, similarly to the first modification, the light measurement device 6 may further include the AFE unit and/or the digital filter unit. Here, the one or more transformation matrices stored in the storage unit 15 may be, for example, a transformation matrix for each combination of the optical sensor unit 11 and the AFE unit and/or the digital filter unit (the optical sensor unit 11 having different types and individual differences and the AFE unit and/or the digital filter unit having different types and individual differences) that can be included in the light measurement device 6. As a result, for example, assuming a case where one or more of the optical sensor unit 11 and the AFE unit and/or the digital filter unit are replaced, it is possible to store a plurality of transformation matrices that consider the difference in type and individual difference in the storage unit 15.

According to the third modification, for example, even when one or more of the optical sensor unit 11 and the AFE unit and/or the digital filter unit are replaced, the setting unit 13 can select an optimum transformation matrix according to the replaced configuration from among the plurality of transformation matrices stored in the storage unit 15 and set the optimum transformation matrix in the arithmetic unit 14. Therefore, the arithmetic unit 14 can perform inverse conversion using the optimum transformation matrix.

Note that, in the third modification, the setting unit 13 may select the transformation matrix set in the arithmetic unit 14 from among one or more transformation matrices stored in the storage unit 15 based on a combination of the optical sensor unit 11 and the AFE unit and/or the digital filter unit designated by the user. The user designation may be made, for example, by the user specifying a combination of the optical sensor unit 11 and the AFE unit and/or the digital filter unit via an input unit (not illustrated) included in the scanning microscope 1, for example. Here, the setting unit 13 may select a transformation matrix corresponding to the combination specified by the user from among one or more transformation matrices stored in the storage unit 15. As a result, an optimum transformation matrix according to the combination specified by the user can be set in the arithmetic unit 14.

Alternatively, the setting unit 13 may select the transformation matrix to be set in the arithmetic unit 14 from among one or more transformation matrices stored in the storage unit 15 based on the user's selection input. Here, the user's selection input may be performed, for example, by the user selecting a desired transformation matrix from among one or more transformation matrices stored in the storage unit 15 via an input unit (not illustrated) included in the scanning microscope 1. As a result, the transformation matrix according to the user's selection input can be set in the arithmetic unit 14.

Figure 4:
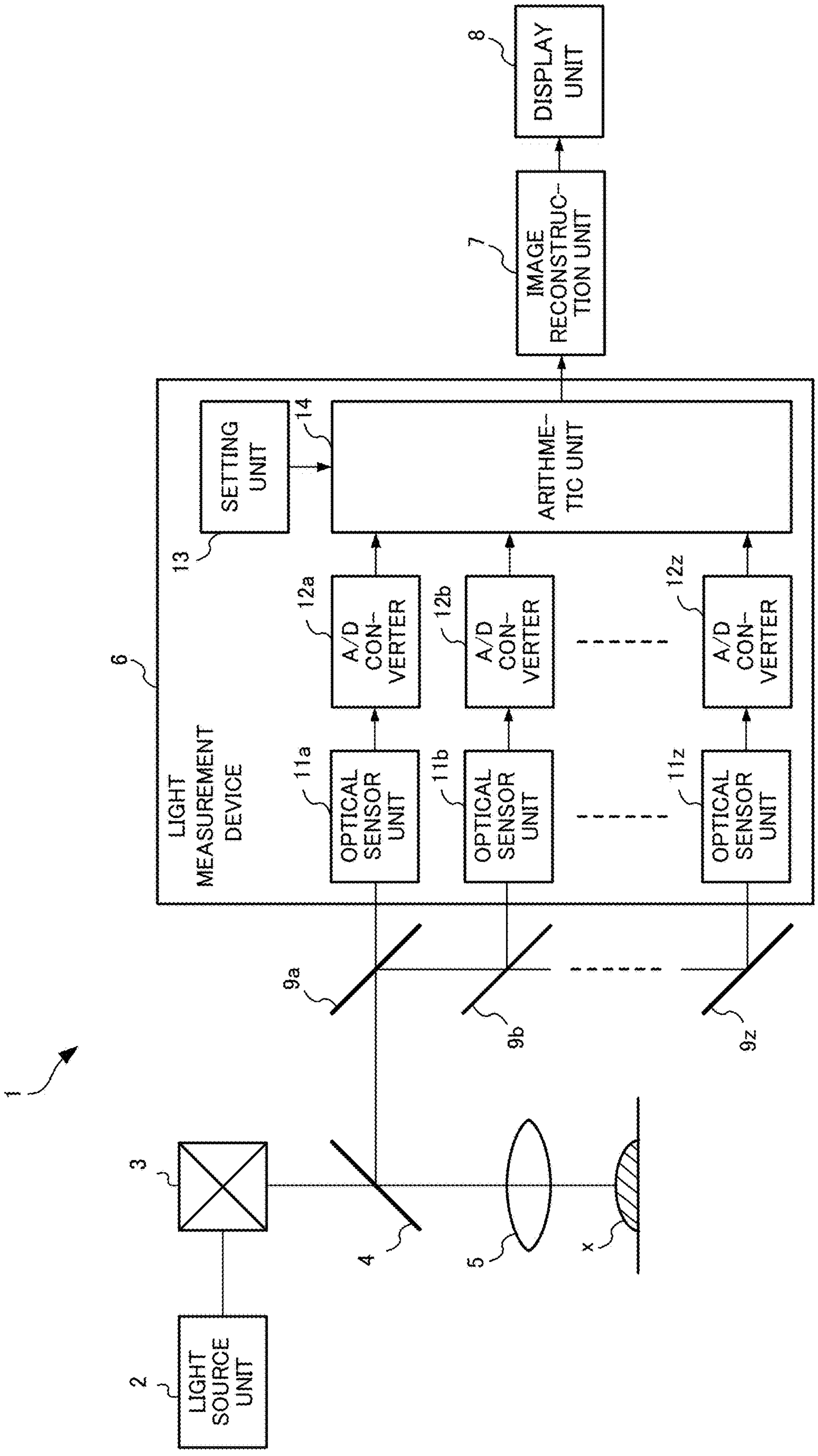
FIG. 4 is a diagram illustrating a configuration of a scanning microscope according to a fourth modification.

Further, as a fourth modification that is another modification, the scanning microscope 1 illustrated in FIG. 1 may be configured as illustrated in FIG. 4. FIG. 4 is a diagram illustrating a configuration of the scanning microscope 1 according to the fourth modification;

As illustrated in FIG. 4, the scanning microscope 1 may further include a plurality of optical elements 9 having different wavelength ranges of light that transmit and reflect fluorescence from the sample X, the light measurement device 6 may include a plurality of sets including the optical sensor unit 11 and the A/D converter 12, and the setting unit 13 may set an optimum transformation matrix for each set in the arithmetic unit 14. Setting an optimum transformation matrix for each set means, for example, setting an optimum transformation matrix according to the type and individual difference of the optical sensor unit 11 included in the set for each set. As a result, the arithmetic unit 14 can correctly calculate the estimated pulse of the signal light incident on the optical sensor unit 11 for each set.

Note that, in FIG. 4 (the same applies to FIGS. 5 and 6 described later), to clarify correspondence relationship, the same alphabet as the alphabet added to the numerical symbol of the optical element 9 that transmits or reflects the light incident on the optical sensor unit 11 is added to the numerical symbol of the optical sensor unit 11 and the A/D converter 12 of each set (for example, the optical element 9*a*, the optical sensor unit 11*a*, and the A/D converter 12*a*). The set may also be referred to as a channel.

According to the fourth modification, since the optimum transformation matrix according to the type and individual difference of the optical sensor unit 11 included in each set is set in the arithmetic unit 14 by the setting unit 13, the arithmetic unit 14 can perform inverse conversion using the optimum transformation matrix for each set.

Further, as a fifth modification that is another modification, in the scanning microscope 1 illustrated in FIG. 4, similarly to the first modification, each set included in the light measurement device 6 may further include the AFE unit and/or the digital filter unit. More specifically, the light measurement device 6 may include a plurality of sets including the optical sensor unit 11, the A/D converter 12, and the AFE unit and/or the digital filter unit, and the setting unit 13 may set an optimum transformation matrix in the arithmetic unit 14 for each set. Setting an optimum transformation matrix for each set means, for example, setting an optimum transformation matrix according to the type and individual difference of each of the optical sensor unit 11 and the AFE unit and/or the digital filter unit included in the set for each set. As a result, the arithmetic unit 14 can correctly calculate the estimated pulse of the signal light incident on the optical sensor unit 11 for each set.

According to the fifth modification, the optimum transformation matrix according to the type and individual difference of each of the optical sensor unit 11 and the AFE unit and/or the digital filter unit included in the set for each set is set in the arithmetic unit 14 by the setting unit 13. Therefore, the arithmetic unit 14 can perform inverse conversion using the optimum transformation matrix for each set.

Figure 5:
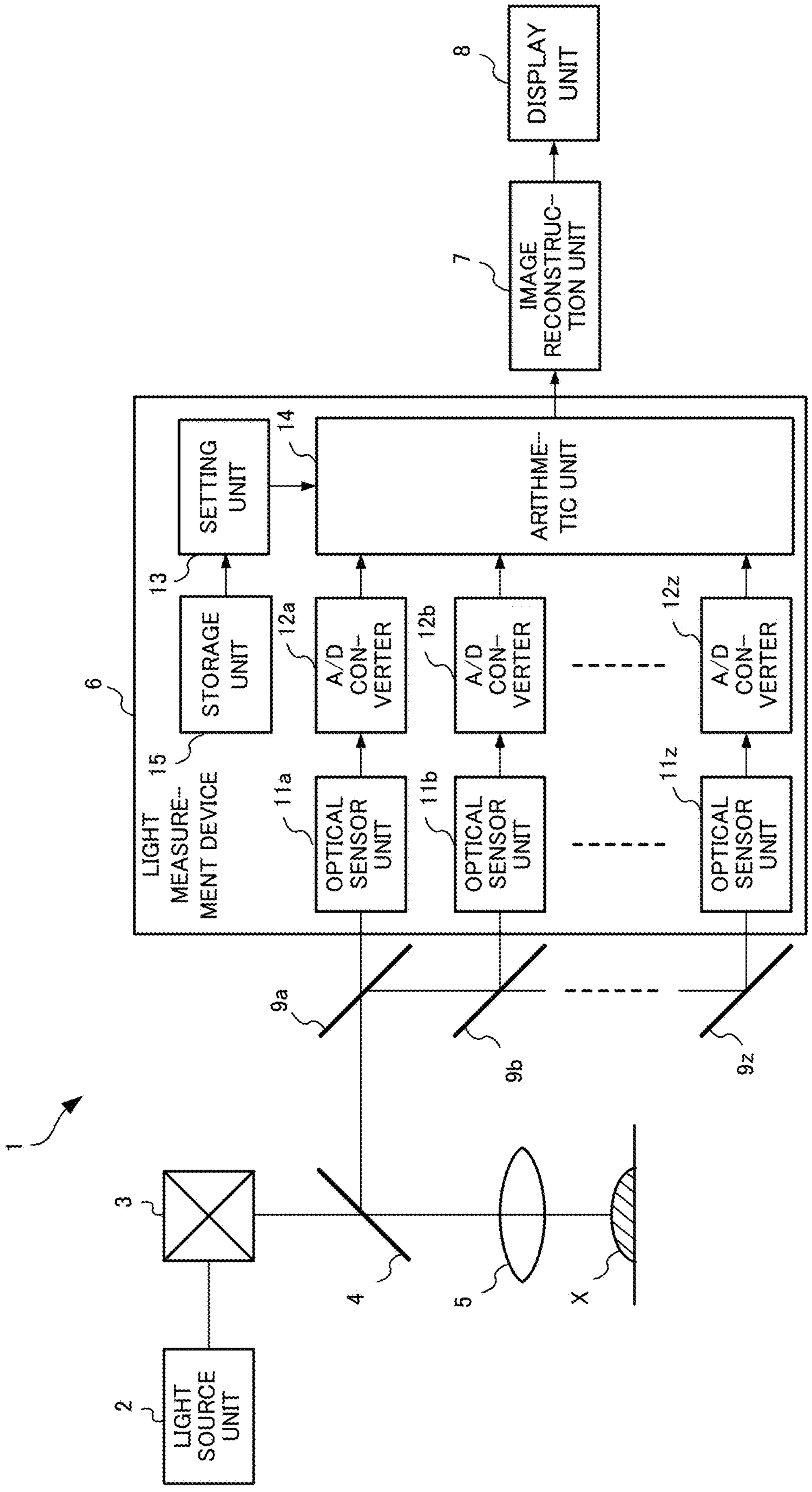
FIG. 5 is a diagram illustrating a configuration of a scanning microscope according to a sixth modification.

Further, as a sixth modification that is another modification, the scanning microscope 1 illustrated in FIG. 4 may be configured as illustrated in FIG. 5. FIG. 5 is a diagram illustrating a configuration of the scanning microscope 1 according to the sixth modification;

As illustrated in FIG. 5, the light measurement device 6 may further include the storage unit 15 that stores a plurality of transformation matrices, and the setting unit 13 may select the transformation matrix to be set in the arithmetic unit 14 for each set from the plurality of transformation matrices stored in the storage unit 15. The plurality of transformation matrices stored in the storage unit 15 may be, for example, a transformation matrix for each optical sensor unit 11 (optical sensor unit 11 having different type and individual difference) that can be included in the set included in the light measurement device 6. As a result, for example, assuming a case where the optical sensor unit 11 included in the set is replaced, it is possible to store a plurality of transformation matrices that consider the difference in type and individual difference in the storage unit 15.

According to the sixth modification, for example, even when the optical sensor unit 11 included in the set is replaced, the setting unit 13 can select an optimum transformation matrix according to the type and individual difference of the replaced optical sensor unit 11 for the set from among the plurality of transformation matrices stored in the storage unit 15 and set the optimum transformation matrix in the arithmetic unit 14. Therefore, the arithmetic unit 14 can perform inverse conversion using the optimum transformation matrix.

Further, as a seventh modification that is another modification, in the scanning microscope 1 illustrated in FIG. 5, similarly to the fifth modification, each set included in the light measurement device 6 may further include the AFE unit and/or the digital filter unit. Here, the plurality of transformation matrices stored in the storage unit 15 may be, for example, a transformation matrix for each combination of the optical sensor unit 11 and the AFE unit and/or the digital filter unit (the optical sensor unit 11 having different types and individual differences and the AFE unit and/or the digital filter unit having different types and individual differences) that can be included in the set included in the light measurement device 6. As a result, for example, assuming a case where one or more of the optical sensor unit 11 and the AFE unit and/or the digital filter unit included in the set are replaced, it is possible to store a plurality of transformation matrices that consider the difference in type and individual difference in the storage unit 15.

According to the seventh modification, for example, even when one or more of the optical sensor unit 11 and the AFE unit and/or the digital filter unit included in the set are replaced, the setting unit 13 can select an optimum transformation matrix according to the replaced configuration for the set from among the plurality of transformation matrices stored in the storage unit 15 and set the optimum transformation matrix in the arithmetic unit 14. Therefore, the arithmetic unit 14 can perform inverse conversion using the optimum transformation matrix.

Figure 6:
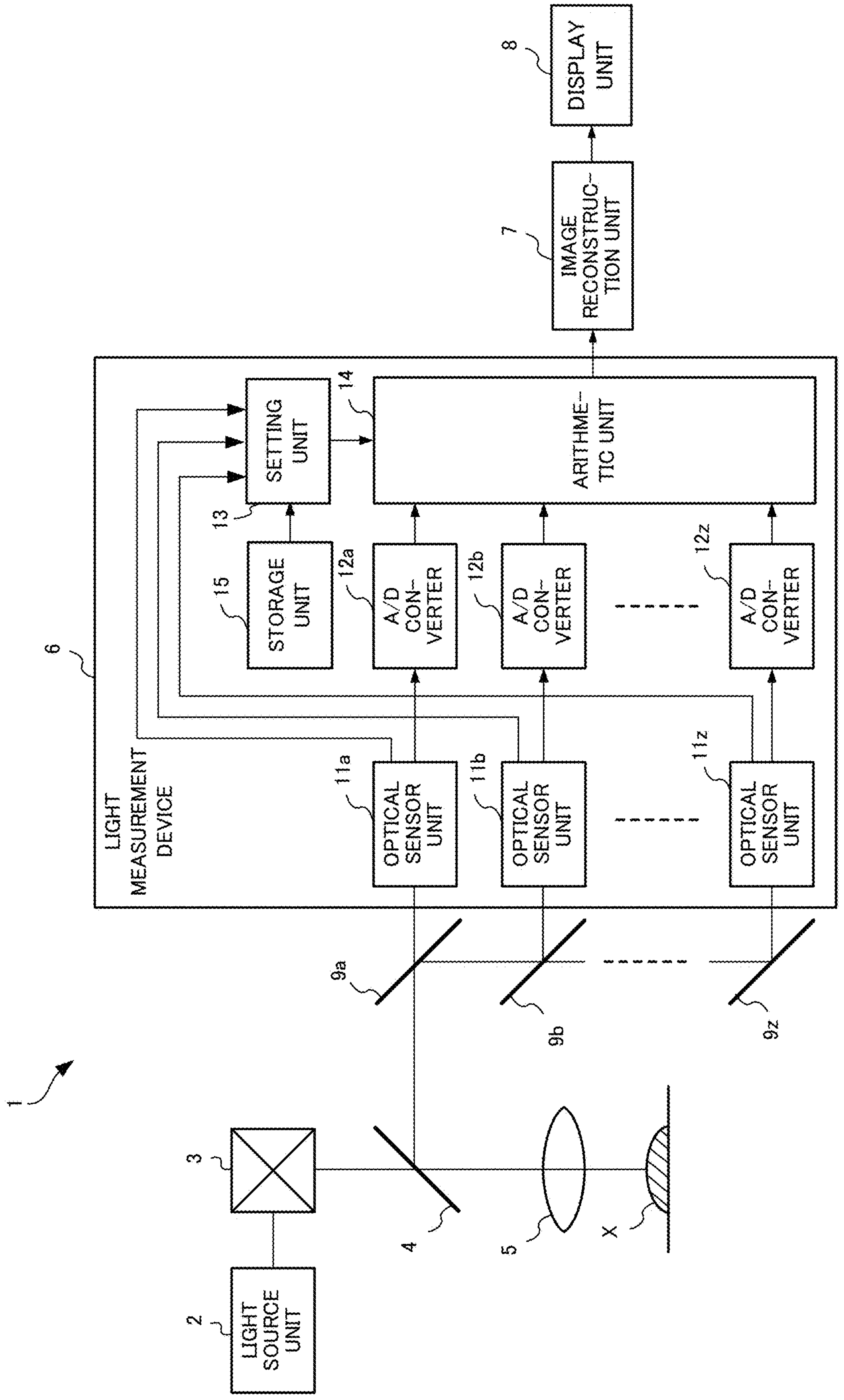
FIG. 6 is a diagram illustrating a configuration of a scanning microscope according to an eighth modification.

Further, as an eighth modification that is another modification, the scanning microscope 1 illustrated in FIG. 5 may be configured as illustrated in FIG. 6. FIG. 6 is a diagram illustrating a configuration of the scanning microscope 1 according to the eighth modification;

As illustrated in FIG. 6, the optical sensor unit 11 of each set included in the light measurement device 6 may be configured to further output an identification signal of the optical sensor unit 11, and the setting unit 13 may select the transformation matrix set in the arithmetic unit 14 for each set from among the plurality of transformation matrices stored in the storage unit 15 based on the identification signal output from the optical sensor unit 11 of each set. Here, each of the plurality of transformation matrices stored in the storage unit 15 is associated with the identification signal of the corresponding optical sensor unit 11, and is an optimum transformation matrix according to the type and individual difference of the corresponding optical sensor unit 11.

According to the eighth modification, the optimum transformation matrix according to the type and individual difference of the optical sensor unit 11 included in the set is set in the arithmetic unit 14 by the setting unit 13 based on the identification signal output from the optical sensor unit 11 included in the set for each set. Therefore, the arithmetic unit 14 can perform inverse conversion using the optimum transformation matrix for each set.

Further, as a ninth modification that is another modification, in the scanning microscope 1 illustrated in FIG. 6, similarly to the seventh modification, each set included in the light measurement device 6 may further include the AFE unit and/or the digital filter unit. Here, the plurality of transformation matrices stored in the storage unit 15 may be, for example, a transformation matrix for each combination of the optical sensor unit 11 and the AFE unit and/or the digital filter unit (the optical sensor unit 11 having different types and individual differences and the AFE unit and/or the digital filter unit having different types and individual differences) that can be included in the set included in the light measurement device 6. Then, the setting unit 13 may select the transformation matrix to be set in the arithmetic unit 14 for each set from among the plurality of transformation matrices stored in the storage unit 15 based on the identification signal output from the optical sensor unit 11 of each set. Also here, each of the plurality of transformation matrices stored in the storage unit 15 is associated with the identification signal of the corresponding optical sensor unit 11, and is an optimum transformation matrix according to the type and individual difference of each of the corresponding optical sensor unit 11 and the AFE unit and/or the digital filter unit included in the set including the corresponding optical sensor unit 11.

According to the ninth modification, the optimum transformation matrix according to the type and individual difference of each of the optical sensor unit 11 and the AFE unit and/or the digital filter unit included in the set is set in the arithmetic unit 14 by the setting unit 13 based on the identification signal output from the optical sensor unit 11 included in the set for each set. Therefore, the arithmetic unit 14 can perform inverse conversion using the optimum transformation matrix for each set.

Figure 7:
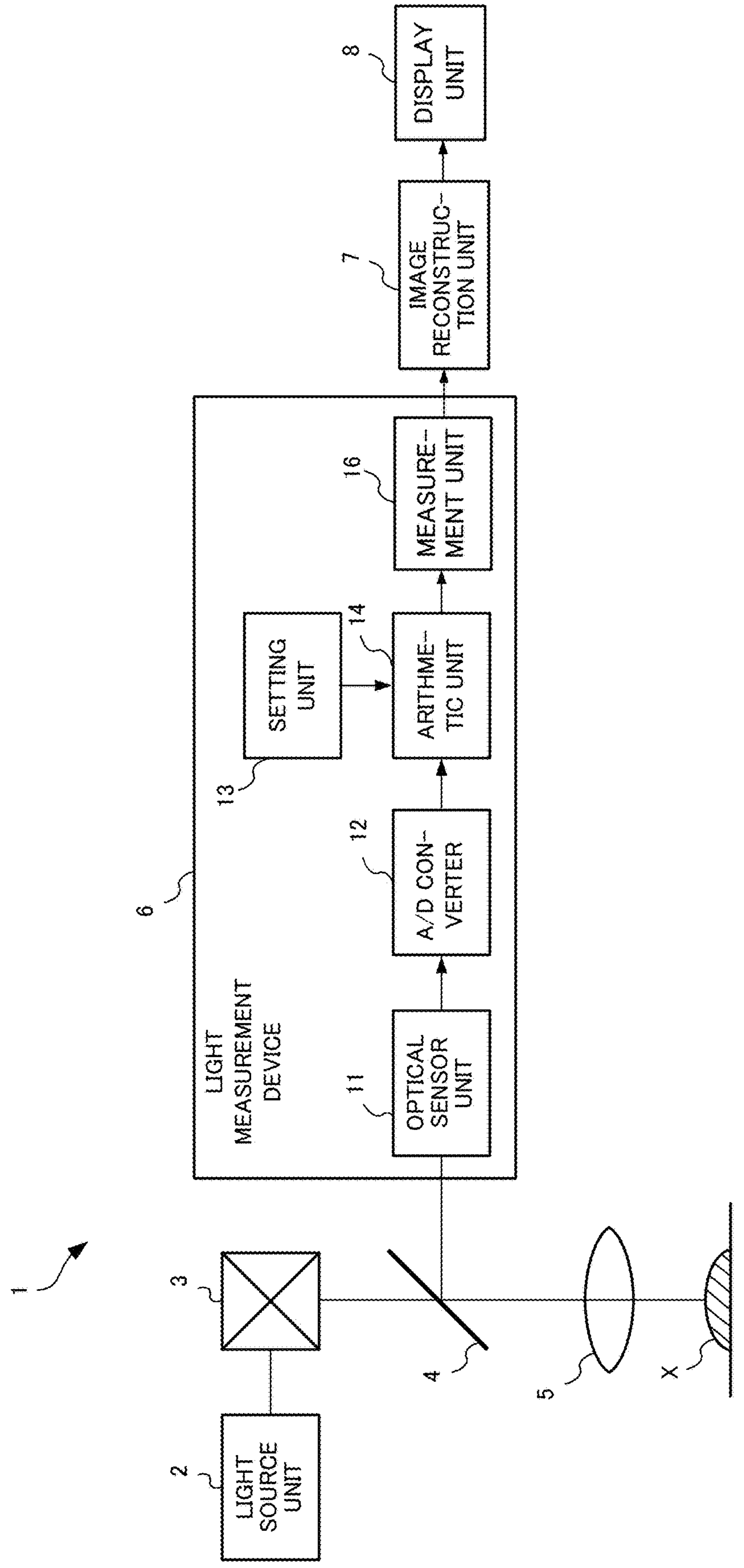
FIG. 7 is a diagram illustrating a configuration of a scanning microscope according to a tenth modification.
Figure 8:
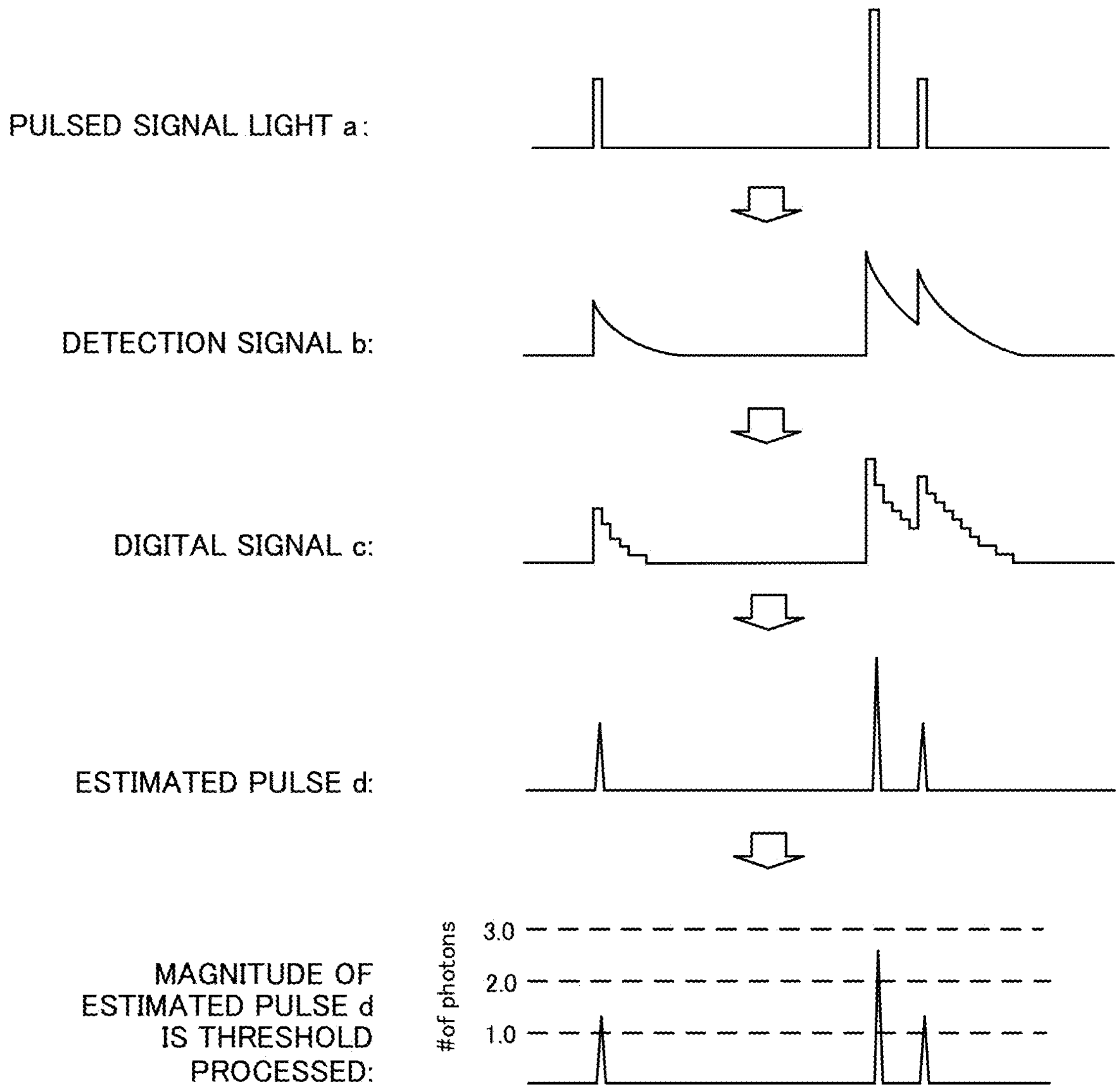
FIG. 8 is a diagram illustrating each signal in a light measurement device.

Further, as a tenth modification that is another modification, the scanning microscope 1 illustrated in FIG. 1 may be configured as illustrated in FIG. 7. FIG. 7 is a diagram illustrating a configuration of the scanning microscope 1 according to the tenth modification; FIG. 8 is a diagram illustrating each signal in the light measurement device 6.

As illustrated in FIG. 7, the light measurement device 6 may further include a measurement unit 16 that measures (photon counts) the magnitude of the estimated pulse output from the arithmetic unit 14 (estimated pulse calculated by the arithmetic unit 14) by threshold processing, and the image reconstruction unit 7 may generate an image having the number of detected photons detected by the optical sensor unit 11 instead of generating an image having the signal intensity of the detection signal of the optical sensor unit 11 corresponding to the amount of fluorescence detected in each pixel (each scanning position). Here, for example, the measurement unit 16 can measure the magnitude of the estimated pulse calculated by the arithmetic unit 14 by determining that the estimated pulse is fluorescence 1 photon when the magnitude of the estimated pulse is equal to or larger than a predetermined threshold value and smaller than twice the predetermined threshold value and determining that the estimated pulse is fluorescence 2 photons when the magnitude is equal to or larger than twice the predetermined threshold value and smaller than three times the predetermined threshold value. Specifically, information on the magnitude of the estimated pulse can be measured by dividing an integral signal of the estimated pulse by the area of a unit pulse. The image reconstruction unit 7 can generate an image showing the fluorescence intensity by arranging the information of the magnitude of the estimated pulse measured by the measurement unit 16 in association with each scanning position.

In the tenth modification, each signal in the light measurement device 6 when pulsed signal light is input to the light measurement device 6 (optical sensor unit 11) is, for example, as illustrated in FIG. 8.

As illustrated in FIG. 8, for example, when a pulsed signal light a is input to the optical sensor unit 11, the output of the optical sensor unit 11 becomes a detection signal b, the output of the A/D converter 12 becomes a digital signal c, and the output of the arithmetic unit 14 becomes an estimated pulse d. Then, when the estimated pulse d is input to the measurement unit 16, the measurement unit 16 measures the magnitude of the estimated pulse d by threshold processing. For example, the magnitude of the estimated pulse d can be measured by determining that the estimated pulse d is fluorescence 1 photon when the magnitude of the estimated pulse d is equal to or larger than a predetermined threshold value ("1.0") and smaller than twice the predetermined threshold value ("2.0") and determining that the estimated pulse d is fluorescence 2 photons when the magnitude is equal to or larger than twice the predetermined threshold value ("2.0") and smaller than three times the predetermined threshold value ("3.0").

According to the tenth modification, the image reconstruction unit 7 can generate an image having the number of detected photons detected by the optical sensor unit 11.

Note that also in the scanning microscope 1 according to each of the first to ninth modifications, similarly to the tenth modification, the light measurement device 6 may further include the measurement unit 16, and the image reconstruction unit 7 may generate an image having the number of detected photons detected by the optical sensor unit 11.

Furthermore, as an eleventh modification that is another modification, in the scanning microscope 1 illustrated in FIG. 7, the measurement unit 16 may integrate the estimated pulse output from the arithmetic unit 14 and measure the magnitude of the integrated estimated pulse by threshold processing instead of measuring the magnitude of the estimated pulse output from the arithmetic unit 14 by threshold processing. For example, the estimated pulse output from the arithmetic unit 14 may be integrated over a predetermined time, and the number of photons within the integration time may be summed and measured.

Figure 9:
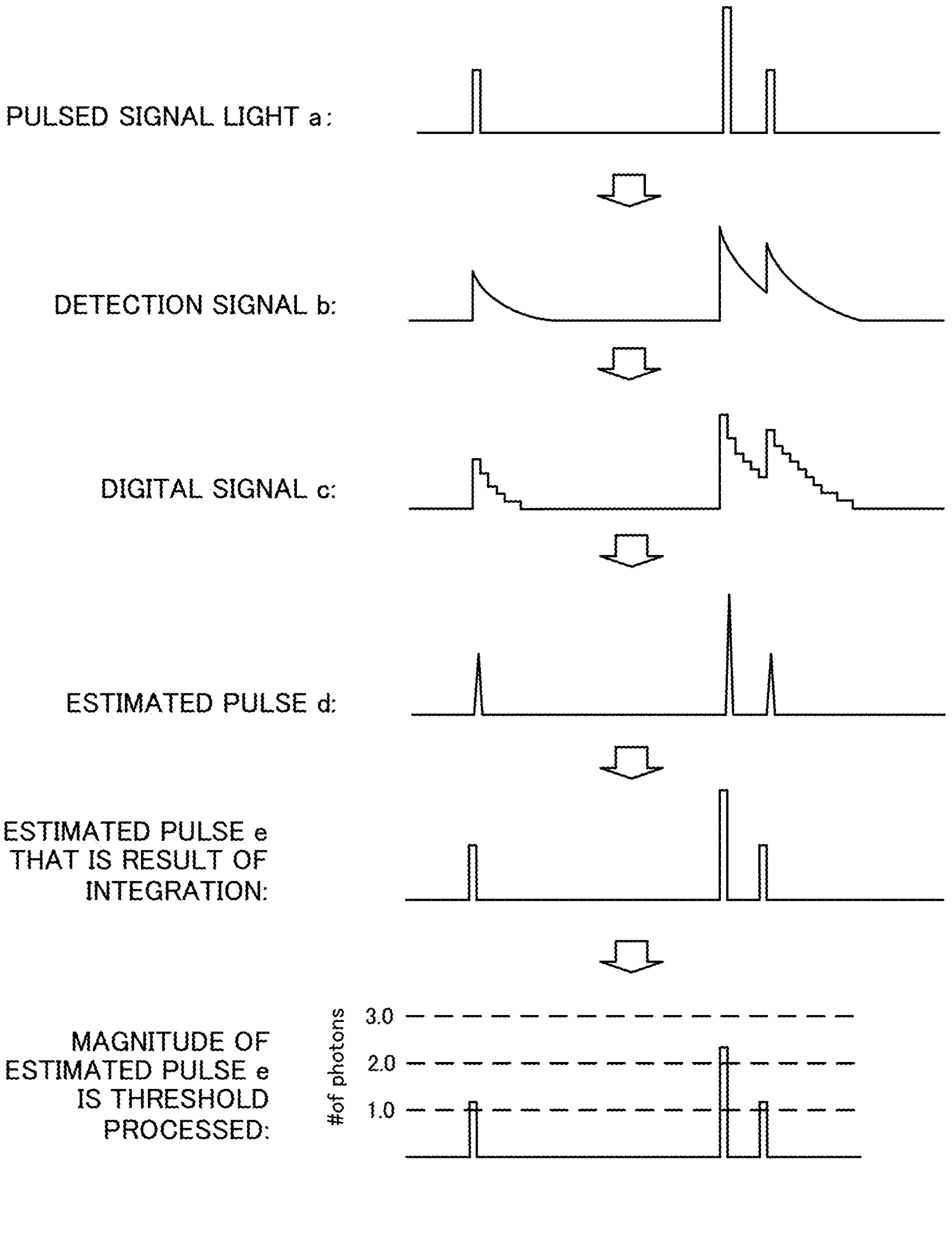
FIG. 9 is a diagram illustrating each signal in the light measurement device.

In the eleventh modification, each signal in the light measurement device 6 when pulsed signal light is input to the light measurement device 6 (optical sensor unit 11) is, for example, as illustrated in FIG. 9. FIG. 9 is a diagram illustrating each signal in the light measurement device 6.

As illustrated in FIG. 9, for example, when a pulsed signal light a is input to the optical sensor unit 11, similarly to the example illustrated in FIG. 8, the output of the optical sensor unit 11 becomes a detection signal b, the output of the A/D converter 12 becomes a digital signal c, and the output of the arithmetic unit 14 becomes an estimated pulse d. Then, when the estimated pulse d is input to the measurement unit 16, the measurement unit 16 integrates the estimated pulse d and measures the magnitude of an estimated pulse e as a result of the integration by threshold processing. For example, the magnitude of the estimated pulse e can be measured by determining that the estimated pulse e is fluorescence 1 photon when the magnitude of the estimated pulse e is equal to or larger than a predetermined threshold value ("1.0") and smaller than twice the predetermined threshold value ("2.0") and determining that the estimated pulse e is fluorescence 2 photons when the magnitude is equal to or larger than twice the predetermined threshold value ("2.0") and smaller than three times the predetermined threshold value ("3.0").

According to the eleventh modification, high quantitativity for photon number measurement can be obtained, the influence of noise can be reduced, and measurement can be performed with high accuracy. The integration time may correspond to an exposure time.

Note that, in the eleventh modification, when integrating the estimated pulse output from the arithmetic unit 14, the measurement unit 16 may perform integration for the same time as a time corresponding to a multiplex number of a multi-diagonal matrix that is the transformation matrix set in the arithmetic unit 14. Accordingly, it is possible to obtain high quantitativity in addition to high temporal resolution.

Furthermore, in the eleventh modification, when integrating the estimated pulse output from the arithmetic unit 14, the measurement unit 16 may determine a detection region by detecting rise and fall of the estimated pulse by threshold processing, and integrate the estimated pulse of the determined detection region. As a result, the timing and time of the integration are dynamically changed, the detection signal is prevented from exceeding the exposure time, and higher measuring performance can be obtained.

Note that, also in the scanning microscope 1 according to each of the first to ninth modifications, similarly to the eleventh modification, the light measurement device 6 may further include the measurement unit 16, and the measurement unit 16 may integrate the estimated pulse output from the arithmetic unit 14 and measure the magnitude of the integrated estimated pulse by threshold processing.

Figure 10:
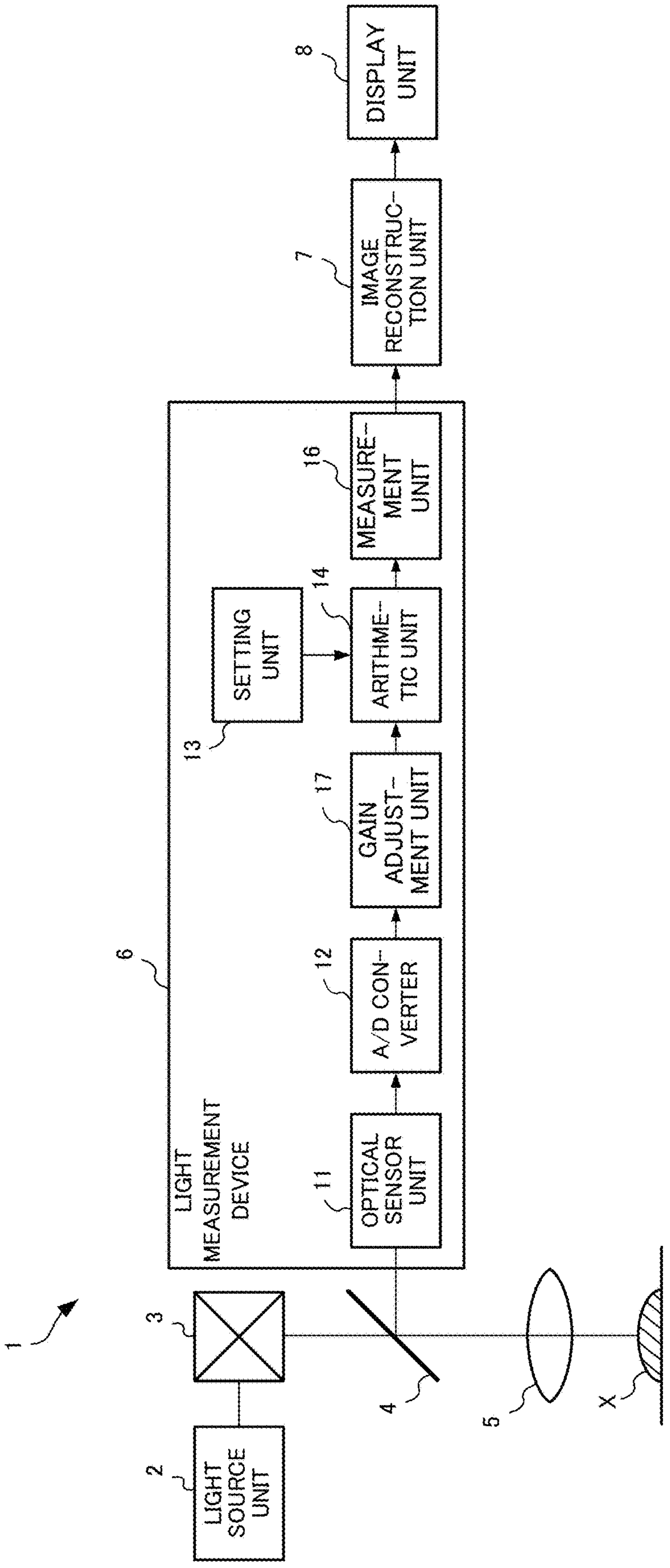
FIG. 10 is a diagram illustrating a configuration of a scanning microscope according to a twelfth modification.
Figure 11:
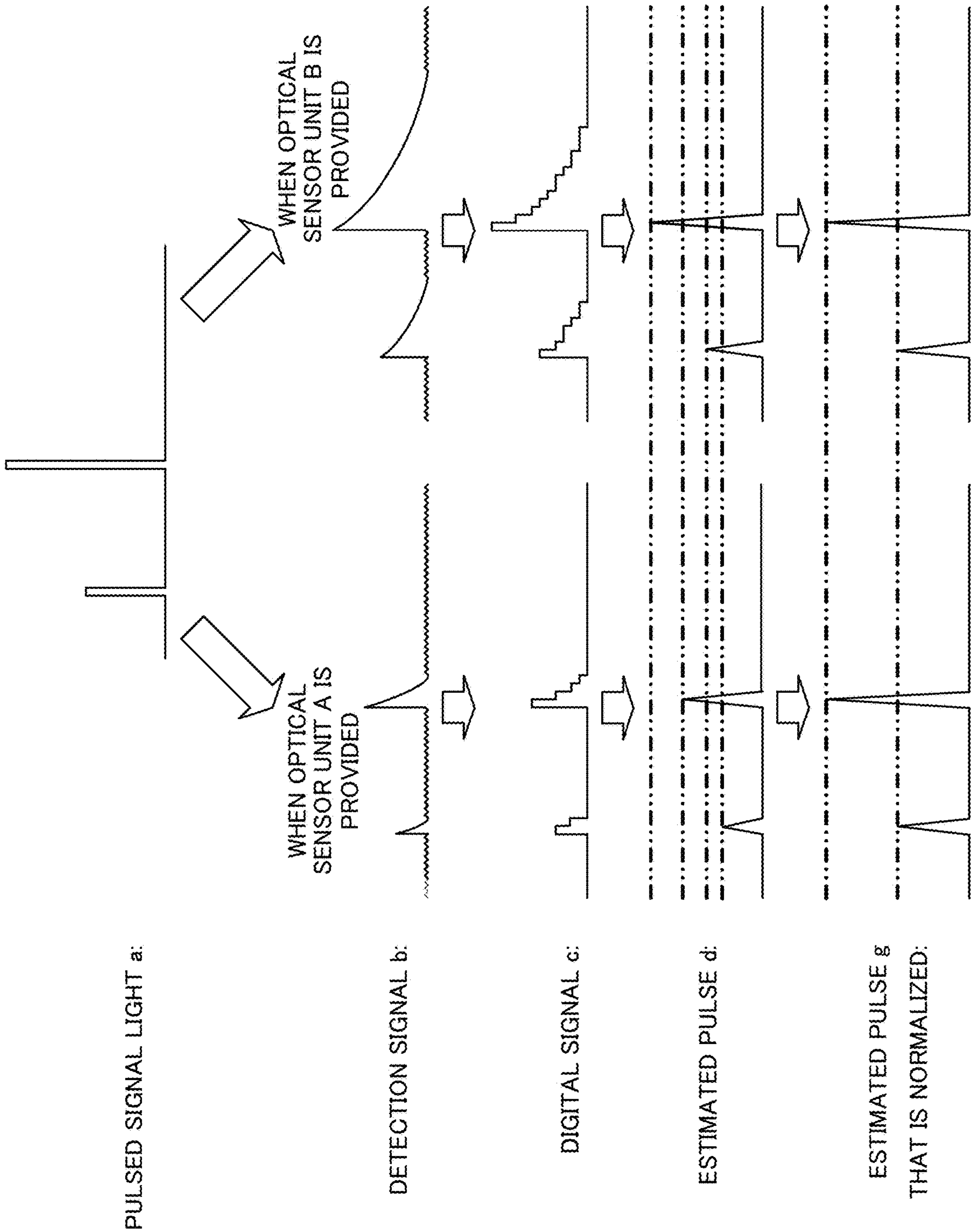
FIG. 11 is a diagram illustrating each signal in the light measurement device.

Further, as a twelfth modification that is another modification, the scanning microscope 1 illustrated in FIG. 7 may be configured as illustrated in FIG. 10. FIG. 10 is a diagram illustrating a configuration of the scanning microscope 1 according to the twelfth modification; FIG. 11 is a diagram illustrating each signal in the light measurement device 6.

As illustrated in FIG. 10, the light measurement device 6 may further include a gain adjustment unit 17 that adjusts a gain of a signal between the A/D converter 12 and the arithmetic unit 14. The gain adjustment unit 17 is, for example, a gain adjustment circuit.

The gain adjustment unit 17 adjusts the gain of the digital signal output from the A/D converter 12 so that the magnitude of the estimated pulse output from the arithmetic unit 14 (estimated pulse calculated by the arithmetic unit 14) is normalized to a constant value. Specifically, when any of the plurality of optical sensor units 11 having different types and individual differences is provided in the light measurement device 6, even when any of the optical sensor units 11 is provided in the light measurement device 6, if optical signals input to the optical sensor unit 11 are the same, the gain adjustment unit 17 adjusts the gain of the digital signal so that the magnitudes of the estimated pulses output from the arithmetic unit 14 are the same (that is, are normalized to a constant value).

For example, when any of the two optical sensor units 11 (referred to as an optical sensor unit A and an optical sensor unit B) having different types and individual differences is provided in the light measurement device 6, each signal in the light measurement device 6 when each optical sensor unit 11 is provided is, for example, as illustrated in FIG. 11.

As illustrated in FIG. 11, for example, when the pulsed signal light a is input to the optical sensor unit 11, when the optical sensor unit 11 is the optical sensor unit A, the detection signal b that is the output of the optical sensor unit A, the digital signal c that is the output of the A/D converter 12, the estimation pulse d that is the output of the arithmetic unit 14 when the gain adjustment unit 17 is not provided, and an estimated pulse g that is the output of the arithmetic unit 14 when the gain adjustment unit 17 is provided (when normalized) are as illustrated on the left side of FIG. 11. On the other hand, when the optical sensor unit 11 is the optical sensor unit B, the detection signal b that is the output of the optical sensor unit B, the digital signal c that is the output of the A/D converter 12, the estimation pulse d that is the output of the arithmetic unit 14 when the gain adjustment unit 17 is not provided, and the estimated pulse g that is the output of the arithmetic unit 14 when the gain adjustment unit 17 is provided (when normalized) are as illustrated on the right side of FIG. 11. As described above, even if the optical sensor unit 11 included in the light measurement device 6 is different, when the optical signals input to the optical sensor unit 11 are the same, the estimated pulse g output from the arithmetic unit 14 becomes the same by normalization by gain adjustment of the gain adjustment unit 17.

According to the twelfth modification, even if the optical sensor unit 11 included in the light measurement device 6 is different, when the optical signals input to the optical sensor unit 11 are the same, the estimated pulse output from the arithmetic unit 14 is the same, and thus, it is not necessary to change the threshold value used when the measurement unit 16 performs threshold processing for each optical sensor unit 11 included in the light measurement device 6, and the measurement unit 16 only needs to have one threshold value used for the threshold processing.

Note that, in the twelfth modification, the gain adjustment unit 17 included in the light measurement device 6 may be provided between the optical sensor unit 11 and the A/D converter 12. Here, the gain adjustment unit 17 adjusts the gain of the detection signal output from the optical sensor unit 11 so that the magnitude of the estimated pulse output from the arithmetic unit 14 is normalized to a constant value.

Furthermore, as a thirteenth modification that is another modification example, in the eleventh modification, the light measurement device 6 may further include the gain adjustment unit 17 between the A/D converter 12 and the arithmetic unit 14, similarly to the twelfth modification. Here, the gain adjustment unit 17 adjusts the gain of the digital signal output from the A/D converter 12 so that the estimated pulse output from the arithmetic unit 14 (estimated pulse calculated by the arithmetic unit 14) is integrated by the measurement unit 16 and the magnitude of the integrated estimated pulse is normalized to a constant value. Specifically, when any of the plurality of optical sensor units 11 having different types and individual differences is provided in the light measurement device 6, even when any of the optical sensor units 11 is provided in the light measurement device 6, if the optical signal input to the optical sensor unit 11 is the same, the gain of the digital signal is adjusted by the gain adjustment unit 17 so that the estimated pulse output from the arithmetic unit 14 is integrated and the magnitude of the integrated estimated pulse becomes the same (that is, normalized to a constant value).

According to the thirteenth modification, similarly to the twelfth modification, even if the optical sensor unit 11 included in the light measurement device 6 is different, when the optical signals input to the optical sensor unit 11 are the same, the estimated pulse output from the arithmetic unit 14 is integrated by the measurement unit 16 and the magnitude of the integrated estimated pulse is the same, and thus it is not necessary to change the threshold value used when the measurement unit 16 performs threshold processing for each optical sensor unit 11 included in the light measurement device 6, and the measurement unit 16 only needs to have one threshold value used for the threshold processing.

Note that, in the thirteenth modification, the gain adjustment unit 17 included in the light measurement device 6 may be provided between the optical sensor unit 11 and the A/D converter 12. Here, the gain adjustment unit 17 adjusts the gain of the detection signal output from the optical sensor unit 11 so that the estimated pulse output from the arithmetic unit 14 is integrated by the measurement unit 16 and the magnitude of the integrated estimated pulse is normalized to a constant value.

In the above-described embodiment and modifications, the scanning microscope 1 may include a light source unit that generates a continuous laser beam (for example, a continuous wave (CW) laser) instead of the light source unit 2 that generates an ultrashort pulsed laser beam.

In addition, the scanning microscope 1 performs imaging of fluorescence intensity, but may perform imaging of fluorescence lifetime.

Figure 12:
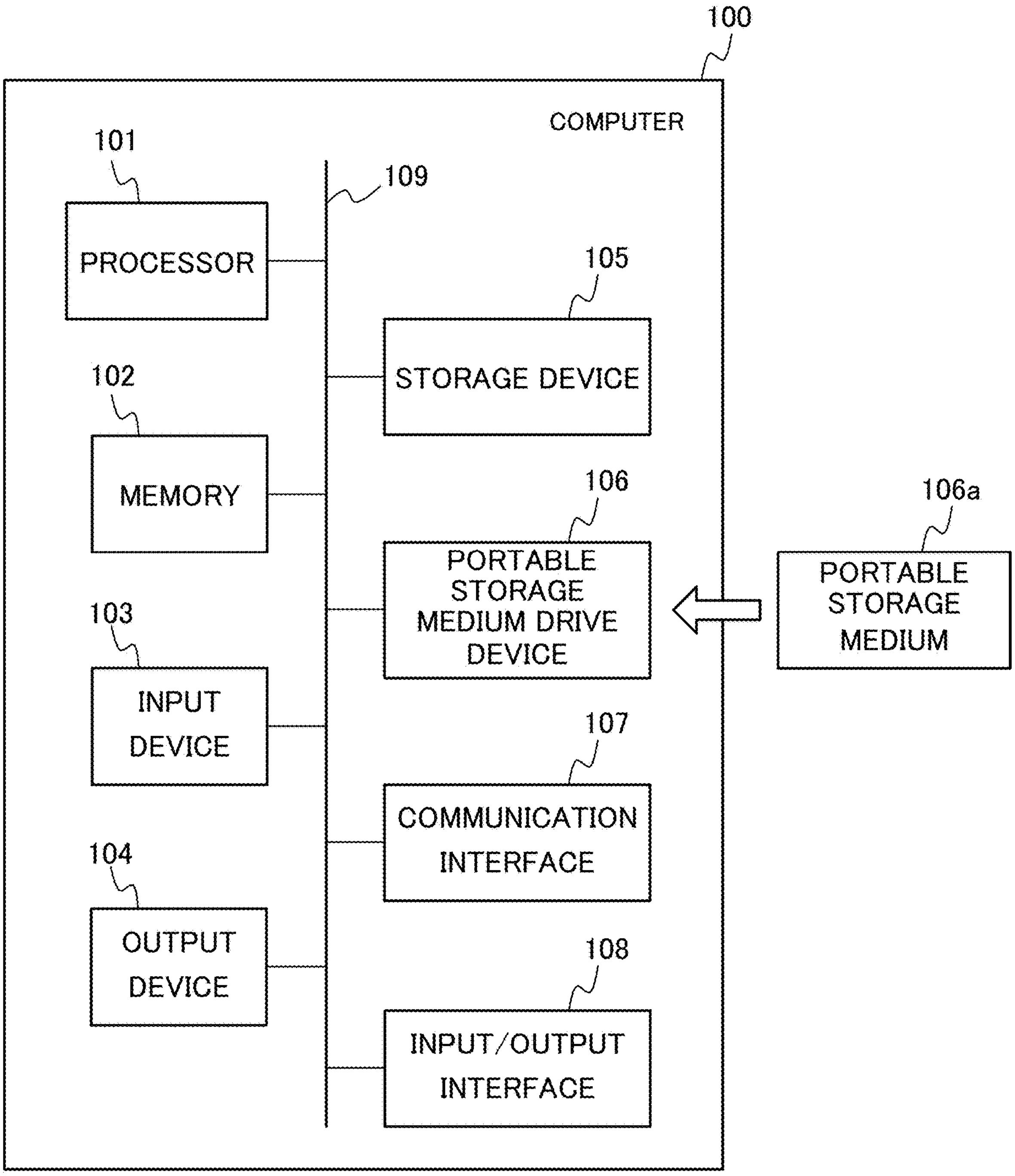
FIG. 12 is a diagram illustrating a hardware configuration of a computer.

Further, a part of the scanning microscope 1 may be implemented by a computer 100 illustrated in FIG. 12. FIG. 12 is a diagram illustrating a hardware configuration of the computer 100.

As illustrated in FIG. 12, the computer 100 includes a processor 101, a memory 102, an input device 103, an output device 104, a storage device 105, a portable storage medium drive device 106, a communication interface 107, and an input/output interface 108, and each of the devices is connected to a bus 109 and can transmit and receive data to and from each other. The processor 101 may be, for example, a single processor, a multiprocessor, or a multi-core processor. The processor 101 performs various types of processing by executing a program such as an operating system (OS) or an application. The memory 102 includes a random access memory (RAM) and a read only memory (ROM). A part of the program executed by the processor 101 or the like is temporarily stored in the RAM. The RAM is also used as a working storage area of the processor 101. The ROM stores a program executed by the processor 101, various data necessary for executing the program, and the like.

The input device 103 is a keyboard, a mouse, a joystick, a touch panel, or the like. The output device 104 is a display device such as a liquid crystal display or the like, or a printer.

The storage device 105 is a device that stores data, and is a hard disk drive (HDD), a solid state drive (SSD), or the like. The portable storage medium drive device 106 drives a portable storage medium 106*a*, accesses contents stored therein, and reads and writes data. The portable storage medium 106*a* is a memory device, a flexible disk, an optical disk, a magneto-optical disk, or the like. The portable storage medium 106*a* also includes a compact disc read only memory (CD-ROM), a digital versatile disc (DVD), a Blu-ray Disc, a universal serial bus (USB) memory, an SD card memory, and the like.

The communication interface 107 is an interface connected to a network in a wired or wireless manner and performing communication with an external device connected to the network. The input/output interface 108 is an interface connected to an external device and input/outputs data to/from the external device.

In such a computer 100, the program executed by the processor 101 and various types of data necessary for executing the program may be stored not only in the memory 102, but also in the storage device 105 or the portable storage medium 106*a*. In addition, the program executed by the processor 101 and various types of data necessary for executing the program may be stored in the storage device 105 or the portable storage medium 106*a* from an external device via the network and the communication interface 107.

In addition, the computer 100 is not limited to the computer illustrated in FIG. 12, and may be configured to include a plurality of some components illustrated in FIG. 12 or may be configured without some components.

In addition, the computer 100 may be configured to include hardware such as a microprocessor, a digital signal processor (DSP), an application specific integrated circuit (ASIC), a programmable logic device (PLD), or a field-programmable gate array (FPGA). For example, the processor 101 may be implemented using at least one of such pieces of hardware.

When a part of the scanning microscope 1 described above is implemented by the computer 100 illustrated in FIG. 12, for example, the A/D converter 12, the digital filter unit, or the gain adjustment unit 17 is connected to the input/output interface 108, and an output signal of the A/D converter 12, the digital filter unit, or the gain adjustment unit 17 is input to the input/output interface 108. Further, the functions of the setting unit 13, the arithmetic unit 14, the measurement unit 16, and the image reconstruction unit 7 are implemented by the processor 101, the function of the storage unit 15 is implemented by one or more of the memory 102, the storage device 105, and the portable storage medium 106*a*, the function of the display unit 8 is implemented by the output device 104, and the function of the input unit (not illustrated) included in the scanning microscope 1 is implemented by the input device 103.

Although embodiments of the present invention (including modifications) have been described above, the present invention is not limited to the above-described embodiments, and various improvements and changes can be made without departing from the gist of the present invention.

What is claimed is:

1. A light measurement device comprising:
- a plurality of sets, each of the sets comprising (i) a photodetector that detects pulsed signal light and outputs a detection signal including an exponential response, and (ii) an A/D conversion circuit that converts the detection signal into a digital signal; and
- a processor that performs:
  - setting of a transformation matrix for inversely converting the digital signal, for each of the sets; and
  - inverse conversion of the digital signal by the set transformation matrix to calculate an estimated pulse of the signal light,
- wherein the processor sets a different transformation matrix for each of the sets according to characteristics of each set.

2. The light measurement device according to claim 1, further comprising:
- a memory that stores a plurality of transformation matrices,
- wherein the processor selects the transformation matrix to be set for each set from among the plurality of transformation matrices stored in the memory.

3. The light measurement device according to claim 2, wherein:
- the photodetector unit further outputs an identification signal of the photodetector, and
- the processor selects the transformation matrix to be set for each set from among the plurality of transformation matrices stored in the memory based on the identification signal.

4. The light measurement device according to claim 1, wherein the processor further performs measurement of a magnitude of the calculated estimated pulse by threshold processing.

5. The light measurement device according to claim 4, further comprising:
- a gain adjustment circuit that adjusts a gain of the detection signal or the digital signal so that the magnitude of the calculated estimated pulse is normalized to a constant value.

6. The light measurement device according to claim 1, wherein the processor further performs integration of the calculated estimated pulse and measurement of a magnitude of the integrated estimated pulse by threshold processing.

7. The light measurement device according to claim 6, further comprising:
- a gain adjustment circuit that adjusts a gain of the detection signal or the digital signal so that the calculated estimated pulse is integrated and the magnitude of the integrated estimated pulse is normalized to a constant value.

8. The light measurement device according to claim 1, wherein the photodetector is a semiconductor optical sensor in which a plurality of avalanche photodiodes operating in Geiger mode are arranged.

9. A scanning microscope comprising:
- a scanner that scans a sample with illumination light emitted from a light source;
- an optical system that condenses the illumination light scanned by the scanner on the sample and condenses signal light generated at each scanning position of the illumination light in the sample;

the light measurement device according to claim 1, which calculates the estimated pulse of the signal light condensed by the optical system; and a processor that reconstructs an image of the sample based on the estimated pulse calculated by the light measurement device.

10. The scanning microscope according to claim 9, further comprising:

a plurality of optical elements having different wavelength ranges for transmitting and reflecting fluorescence from the sample, wherein:

the light measurement device comprises a plurality of photodetectors including the photodetector, and the plurality of optical elements branch the fluorescence from the sample to the plurality of photodetectors included in the light measurement device.

11. The light measurement device according to claim 1, wherein the characteristics of each set include individual variations of the photodetector and the A/D conversion circuit included therein.

* * * * *